United States Patent
Argintaru et al.

(10) Patent No.: US 10,639,550 B2
(45) Date of Patent: May 5, 2020

(54) SYSTEM AND METHOD FOR DYNAMICALLY ALLOCATING RESOURCES TO A GAME PROCESS

(71) Applicant: BullGuard Ltd., London (GB)

(72) Inventors: Danut Emil Argintaru, Constanta (RO); Robert Allan Clyde, Pleasant Grove, UT (US)

(73) Assignee: BullGuard Ltd, London (GB)

( * ) Notice: Subject to any disclaimer, the term of this patent is extended or adjusted under 35 U.S.C. 154(b) by 103 days.

(21) Appl. No.: 15/490,790

(22) Filed: Apr. 18, 2017

(65) Prior Publication Data
US 2018/0296922 A1    Oct. 18, 2018

(51) Int. Cl.
*G06F 9/50* (2006.01)
*A63F 13/65* (2014.01)
*A63F 13/50* (2014.01)

(52) U.S. Cl.
CPC .............. *A63F 13/65* (2014.09); *A63F 13/50* (2014.09); *G06F 9/5066* (2013.01); *A63F 2300/69* (2013.01)

(58) Field of Classification Search
CPC .... G06F 1/3203; G06F 9/5027; G06F 9/5094; G06F 1/329; G06F 2209/508; G06F 9/4881; G06F 9/505; G06F 2209/5021; G06F 9/4843; G06F 9/5038
See application file for complete search history.

(56) References Cited

U.S. PATENT DOCUMENTS

| | | | |
|---|---|---|---|
| 5,752,030 A * | 5/1998 | Konno ................. | G06F 9/4881 712/231 |
| 2004/0001476 A1* | 1/2004 | Islam .................... | G06F 9/546 370/352 |
| 2009/0235260 A1* | 9/2009 | Branover ............. | G06F 1/3203 718/102 |
| 2010/0332869 A1* | 12/2010 | Hsin .................... | G06F 1/3203 713/320 |
| 2011/0271161 A1* | 11/2011 | Kursun .................. | G06F 11/24 714/736 |
| 2015/0143379 A1* | 5/2015 | Sonoda ................ | G06F 9/5038 718/103 |
| 2016/0086083 A1* | 3/2016 | Chung ................. | G06F 1/3228 706/46 |
| 2016/0246647 A1* | 8/2016 | Harris .................. | G06F 9/4856 |
| 2018/0120920 A1* | 5/2018 | Iyigun .................. | G06F 1/3203 |
| 2018/0232036 A1* | 8/2018 | Varadarajan ......... | G06F 1/3209 |

* cited by examiner

*Primary Examiner* — Dong U Kim
(74) *Attorney, Agent, or Firm* — Cooley LLP

(57) ABSTRACT

A method of allocating computer resources in a computer system including a multicore processor having a plurality of cores. The method includes monitoring usage of the computer resources by processes executing on the computer system and determining, based upon the monitoring, that one of the processes is a high-utilization process consuming greater than a predefined threshold of the computer resources and corresponds to an application in an interactive state. One or more of the plurality of cores are allocated to the high-utilization process and other of the plurality of cores are allocated to remaining processes, thereby improving performance of the high-utilization process. Upon detecting the application has transitioned from the interactive state, one or more of the cores are previously allocated to the high-utilization process are enabled to be allocated to other than the high-utilization process.

25 Claims, 6 Drawing Sheets

SYSTEM AND METHOD FOR DYNAMICALLY ALLOCATING RESOURCES TO A GAME PROCESS

FIELD

This application is generally related to improving the performance of computer programs running on computer systems that include multicore processors. More specifically, but not exclusively, the application relates to methods and apparatus for improving the performance of computer programs requiring significant computer resources in multicore computer systems.

BACKGROUND

Certain modern computer systems intended for consumer use have been designed to accommodate game applications by, for example, being configured with high-performance graphics processing units and substantial memory resources. However, game players desiring optimal game performance tend to want to minimize interferences in game performance caused by the execution of other programs. Simply put, users engaged in playing a game would prefer an uninterrupted experience and as much game performance as possible. However, game performance may often noticeably decrease when another program, such as, for example, an antivirus or a system update utility, begins to heavily utilize system resources.

Some, but not all optimizations can be achieved by manually configuring the operating system's settings. For example, some sophisticated users may engage in manually dedicating processor cores to the game process. This requires manually changing the affinity (i.e. on which processor cores the process is allowed to run) of every running process, except for key operating system processes which should not have their affinity changed. This procedure should be repeated each time a game is started. Obviously, this can be a time-consuming operation and it requires knowledge of internal characteristics of computer operating systems which most users will not possess.

Another approach has been to install a dedicated computer program to dedicate one or more cores of a multicore processor to a game process. However, such dedicated programs do not automatically detect when game applications are launched and tend to require users to start game applications through the application interface of the dedicated program. Moreover, such dedicated programs do not monitor the resource utilization of the game applications. As a result, a user may be required or incented to test or otherwise experiment with various features in order to determine their impact on performance.

Various antivirus vendors have "gaming modes" available in their products. Such gaming modes may be manually triggered or, alternatively, actuated when full screen operation is detected. Once a gaming mode has been triggered, antivirus protection may be turned off. This unfortunately leaves the computer system vulnerable to attack during the duration of game play and until the gaming mode is manually or automatically turned off. Moreover, existing antivirus gaming modes fail to dedicate processor cores to the game's process.

Other background processing programs including backup programs, file sync programs, cloud file sync programs (e.g., Dropbox, OneDrive, etc.), e-mail sync programs, may have the need for similar game modes . . . .

SUMMARY

Disclosed herein are automated systems and methods for improving the performance of various applications, such as computer games, which tend to use relatively high levels of CPU and/or GPU resources.

In one aspect the disclosure relates to a method for improving performance of a game process in a computer system including a multicore processor having a plurality of cores. The method includes automatically detecting the game process that has begun executing on one or more of the plurality of cores. Following detection of the game process, other processes are automatically allocated to one of the plurality of cores different from the processor core or cores on which the game process is executing.

The disclosure is also directed to a method of allocating computer resources in a computer system including a multicore processor having a plurality of cores. The method includes monitoring usage of the computer resources by processes executing on the computer system. Based upon this monitoring, it may be determined that one of the processes is a high-utilization process consuming greater than a predefined threshold of the computer resources and corresponds to an application in an interactive state. The method further includes allocating one or more of the plurality of cores to the high-utilization process. Other of the plurality of cores may then be allocated to remaining ones of the processes, thereby improving performance of the high-utilization process. Upon detecting that the application has transitioned from the interactive state, one or more of the plurality of cores are enabled to be allocated to other than the high-utilization process.

In another aspect the disclosure pertains to a method for improving performance of a game process in a computer system including a multicore processor having a plurality of cores. The method includes determining a number of the plurality of cores required to be utilized by the game process in order to meet one or more performance criteria. Upon this determination being made the game process may be allocated to the determined number of the plurality of cores. The method further includes parking one or more remaining cores in order to reduce heat generated by the processor, potentially allowing the system to increase the processor's frequency, and thereby improve performance of the game process.

The disclosure also relates to a system configured to optimize application performance. The computer system includes a multicore processor having a plurality of cores and a memory including a performance optimization module. The performance optimization module is configured to monitor usage of computer resources by processes executing on the computer system and determine that one of the processes is a high-utilization process in an interactive state that consumes greater than a predefined threshold of the computer resources. The module is further configured to allocate one or more of the plurality of cores to the high-utilization process and allocate other of the plurality of cores to remaining ones of the processes. This allocation improves performance of the high-utilization process. Upon detecting the application has transitioned from the interactive state, the module may enable the cores previously allocated to the high-utilization process to be allocated to other than the high-utilization process.

By dedicating computer resources to a high-utilization process such as a computer game, any decreases in performance due to interference from other processes can be minimized and potentially not detectable by the user. Because the detection is automated, less computer-experienced users can benefit from the disclosed optimizations without having to interact with the computer system.

The disclosed optimization approaches can also be applied to other programs that require high framerates such as, for example, programs enabling view of a 4K or High Definition video, other graphics applications or, more generally, other applications requiring high CPU usage. In implementations in which the execution of such other applications cannot be automatically detected in the manner described hereinafter, the disclosed performance optimizations may be initiated through user input.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Figure 1:
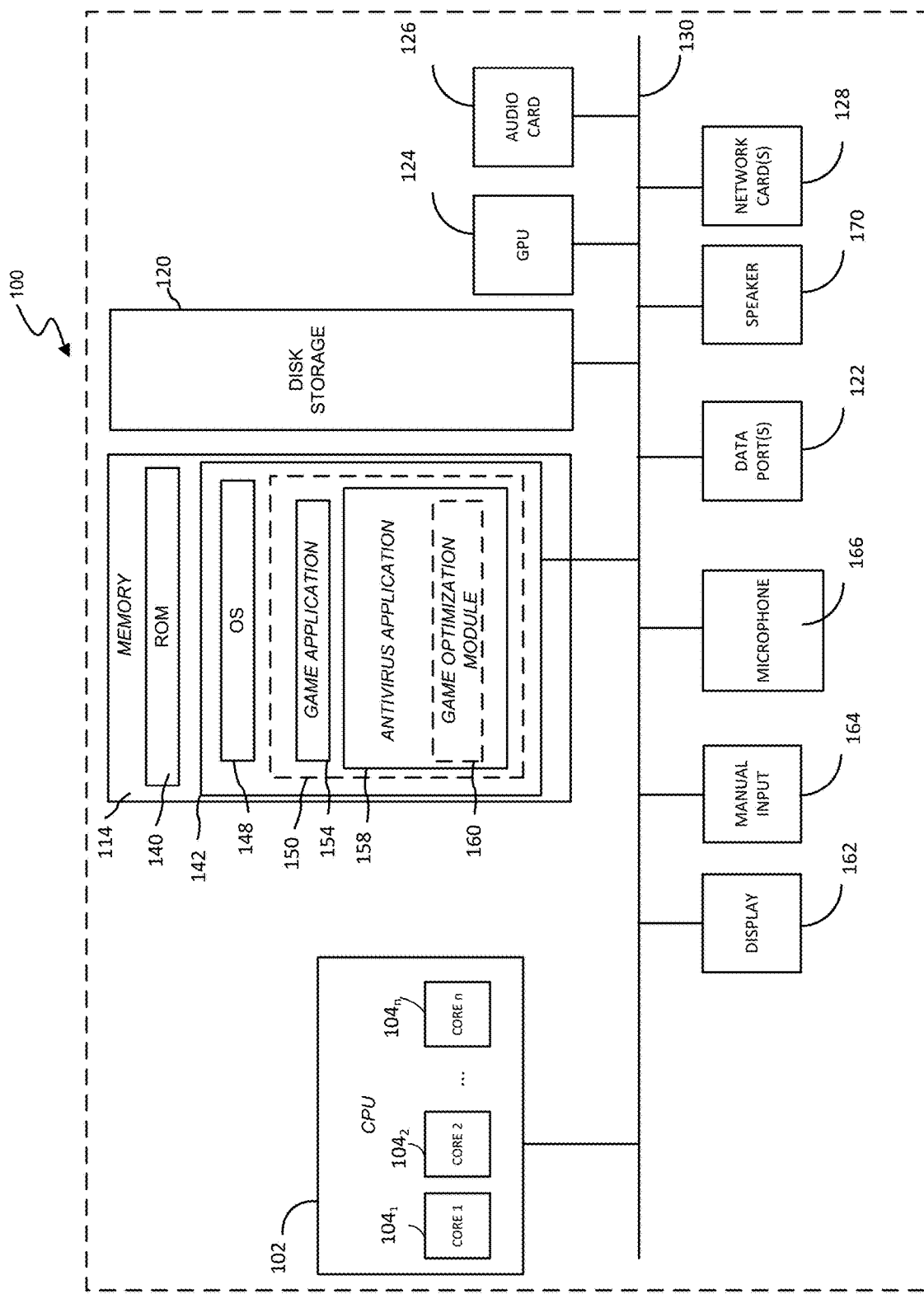
FIG. 1 is a block diagram illustrating the principal components of a computer system configured in accordance with teachings of the present disclosure.

Various embodiments are described below with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Disclosed herein are systems and methods capable of improving the performance of various applications such as computer games, streaming media or other applications characterized by high framerates, or applications which otherwise use relatively high levels of CPU or GPU resources. The disclosed methods have the effect of protecting such games and other high-utilization processes from interference caused by the execution of other programs, thus improving game performance and the user experience. Implementation of the teachings herein also enable antivirus and other security protection to remain operational without noticeably degrading the performance of such games or other high-CPU-usage programs.

In one aspect, disclosed herein is a system and method for automatically detecting when a computer game has started and for then optimizing the game process so as to improve the user experience. When the game stops running or becomes non-interactive, the computer system may be instructed to revert the modifications made to the operating system state in the optimizations phase. In one implementation, computer code involved in performing at least a portion of the disclosed method may be instantiated as a dedicated computer program. In other embodiments such computer code may be included within, for example, an antivirus program, endpoint protection program, security program, backup program, file sync program and the like.

As is discussed more fully below, in one embodiment the disclosed method for improving game performance includes a detection phase and an optimization phase. In one embodiment all running processes on a computer system are monitored during the detection phase. During this phase the CPU and GPU utilization of each process may be measured. In addition, each process may be examined to determine whether it is running in a fullscreen mode and whether the window associated with the process is active in the foreground. In addition, any graphics API's (e.g., DirectX, OpenGL) utilized by the process may be identified. Based upon these determinations and measurements, a decision is then made as to whether any of the running processes correspond to a game application. To the extent any processes corresponding to a game are detected, the resource usage of such processes may continue to be monitored in order to inform the selection of any optimization operations carried out during the optimization phase.

During optimization, various resource allocation operations may be performed in order to optimize performance of the game process. The operations may include, for example, dedicating computer resources to the game process. In a multicore computer system environment, such operations may include automatically reserving one or more CPU cores for the game process and restricting other processes to one or more other CPU core(s), or increasing the CPU priority, IO priority and/or network priority associated with the game process. In addition, other processes (e.g., antivirus or auto-backup processes) may be throttled back by lowering the CPU, IO and networking bandwidth allocation and priority associated with such other processes. In certain embodiments memory optimizations may also be performed. Other optimizations which may be implemented include, for example, switching to a higher performance power plan, disabling other software applications, or tuning of features such as hyper-threading or core parking which tend to have an impact on game performance.

In addition to game applications, the teachings herein may also be applied to enhance the performance of other programs or functions which require or involve high framerates or CPU usage (e.g., viewing a 4K or High Definition video or running a complex graphics application).

Referring now to FIG. 1, a block diagram illustrating the principal components of a computer system 100 configured in accordance with teachings of the present disclosure is shown. Computer system 100 may be used to implement a desktop computer, a workstation, a laptop computer, or other type of data processing device. As shown, computer system 100 includes a multicore central processing unit ("CPU") 102 having a plurality of cores 104, system memory 114, disk storage 120, data port(s) 122, graphics processing unit (GPU) 124, audio card 126 and network card(s) 128 connected by system bus 130. System bus 130 may include a memory bus or memory controller, a peripheral bus, and a local bus, and may utilize any of a various known bus architectures. Network card(s) 128 may provide an Ethernet, Wi-Fi, GSM, Bluetooth or other wired, wireless, or cellular network interface for connecting computer system 100 to an external network, such as the Internet. Data port 122 may be any data port as is known in the art for interfacing with an external accessory using a data protocol such as RS-232, USB, or Firewire. Disk storage 120 may be a conventional read/write memory such as a magnetic disk drive, floppy disk drive, compact-disk read-only-memory (CD-ROM) drive, digital video disk (DVD) read or write drive, transistor-based memory or other computer-readable memory device as is known in the art for storing and retrieving data.

In one embodiment system memory 114 may include a read-only memory (ROM) 140 and random access memory (RAM) 142. The ROM 140 generally stores a basic input/output system (BIOS), which contains foundational routines to convey information between components of computer system 100. RAM 142 stores an operating system 148 (OS), such as, for example, Windows®, Linux or other type of OS. System memory 114 also stores applications and programs 150 currently executing as processes on the computer system 100. These programs may include, for example, a game application 154 and an antivirus application 158 configured with a game optimization module 160 in the manner described herein.

CPU 102 communicates with a plurality of peripheral equipment. Additional peripheral equipment may include a display 162, manual input device 164 and microphone 166. Display 162 may be a visual display such as a liquid crystal display (LCD) screen, touch-sensitive screen, or other monitors as are known in the art for visually displaying images and text to a user. Manual input device 164 may be a conventional keyboard, keypad, mouse, trackball, or other input device as is known in the art for the manual input of data. Microphone 166 may be any suitable microphone as is known in the art for providing audio signals to CPU 102. In addition, a speaker 170 may be attached for reproducing audio signals from CPU 102. It is understood that microphone 160 and speaker 170 may include appropriate digital-to-analog and analog-to-digital conversion circuitry as appropriate.

Figure 2:
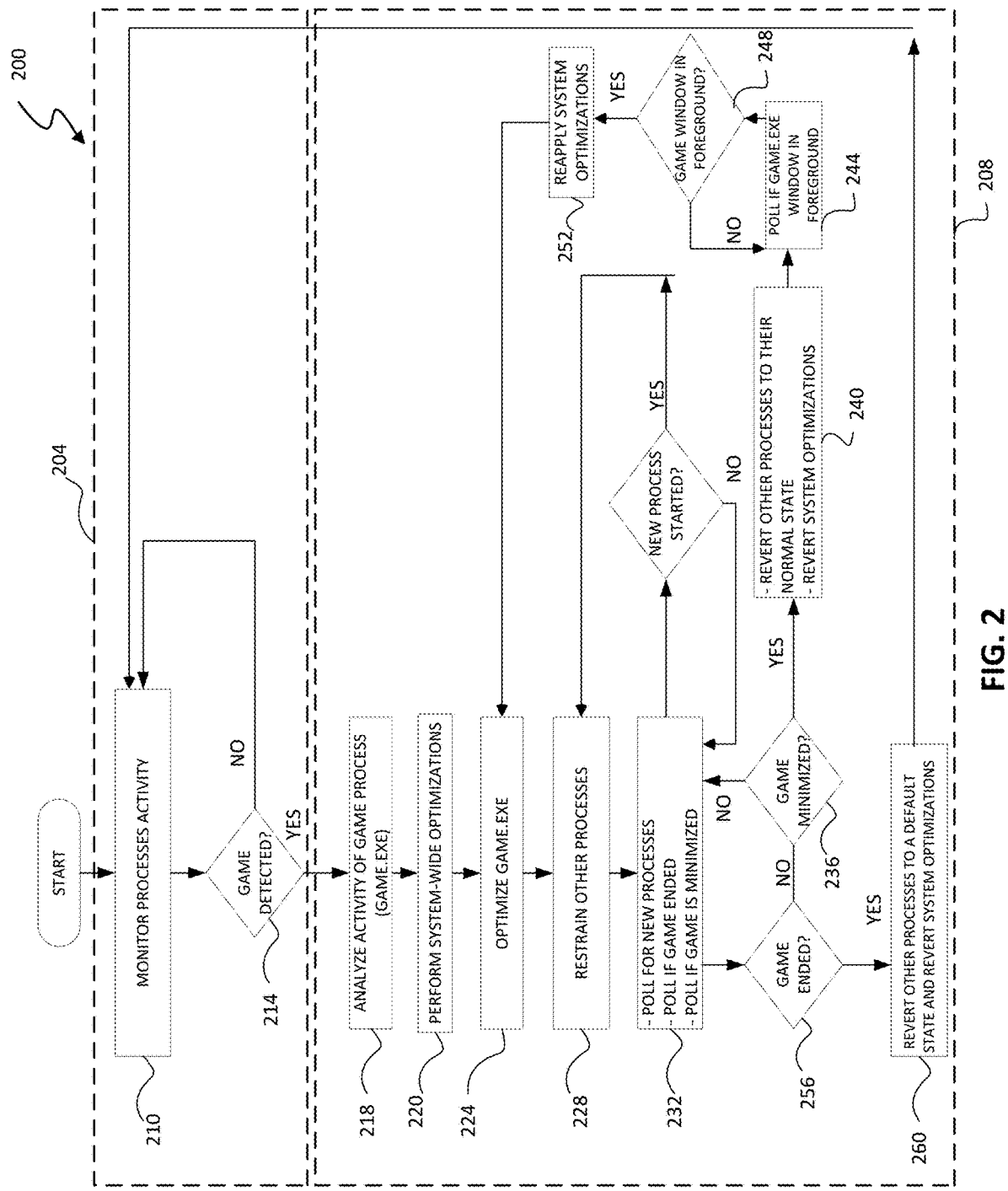
FIG. 2 is a flowchart representative of a method for improving game performance in accordance with the disclosure.

Attention is now directed to FIG. 2, which is a flowchart representative of a method 200 for improving game performance in accordance with the disclosure. In one embodiment the detection and optimization operations described with reference to FIG. 2 are performed by the game optimization module 150 of the antivirus application 158. However, in other implementations these operations could be carried out by a standalone application program or by a module within a different application program (e.g., a security program).

As shown, the method 200 may include a detection phase 204 and an optimization phase 208. During the detection phase, processes executed by the CPU 102 are typically monitored at a regular time intervals such as, for example, once per second (stage 210). Such monitoring may include, for example, determining when the utilization of the GPU 124 by a process exceeds a given threshold (e.g., 50% of the resources of the GPU 124 consumed by the process). When this occurs a check may be made to determine if the process is running in (i) a fullscreen mode, or (ii) a windowed mode in which the window for the process is in the foreground. If either condition (i) or (ii) exists and the GPU utilization by the process exceeds the given threshold, then in one embodiment it is determined that the process is a game (stage 214). As an alternative to the implementation of stage 214 discussed above or as an additional check as part of such implementation, system hooks could be installed in the initialization functions of the most popular APIs for rendering 2D and 3D vector graphics currently in existence (e.g., DirectX and OpenGL) in order to detect processes causing such APIs to be initialized. Another method would be to simply enumerate the loaded libraries of each process and determinate if one of those libraries is related to one of the graphics APIs. It has been found that if a relatively high percentage (e.g., greater than 50%) of the resources of the GPU 124 are utilized by a process and a graphics API such as DirectX or OpenGL has been loaded, there exists a high likelihood that the process is a game. The optimization phase 208 may begin once it has been determined during the detection phase 204 that one of the processes executed by the CPU 102 is a game.

It has been recognized that certain processes such as, for example, web browsers, Winword, Skype, Dropbox or other applications with a graphical user interface that loads one of the graphics APIs, may affect resource utilization in the computer system 100 in a similar manner to games. Such processes usually do not need high computer resource usage, so their optimization is not desirable. The threshold for GPU usage should be set high enough so that these kind of processes are not identified as games. However, false positives may theoretically occur. In these cases the game optimization module 160 may be configured so as to not automatically begin the optimization phase 208 with respect to such a process but to instead enable a user to select whether the optimization phase 208 should proceed. Such user selection could be made through, for example, settings associated with the game optimization module or through a "pop-up" menu or interface rendered via the display 162 at the conclusion of stage 204.

The optimization phase 208 may begin by monitoring the utilization of the CPU 102 by the threads of the game process in order to determine the number of threads of the game associated with high utilization of the CPU 102 (stage 218). The thread information collected may be useful in subsequently determining which and how many CPU cores 104 should be allocated to the game and which CPU cores 104 should be left for other processes. Next, in one embodiment, system-wide optimizations intended to enhance performance of the detected game process (game.exe) are performed (stage 220). These optimizations may include, for example, switching to a customized higher performance power plan, launching a user configured program with parameters, stopping or freezing various unneeded processes, and/or delaying certain scheduled tasks (stage 220). In one embodiment the customized higher performance power plan may disable core parking (e.g., on all cores 104 or on non-hyper-threaded cores 104), set minimum processor state to 100%, set processor performance boost policy to 100% (if available), set the PCI express link state power management to off, and disable turning off disk storage 120. The user-configured program could be, for example, an overclocking program for the GPU 124 or CPU 102.

Referring again to FIG. 2, the game optimization module 160 will typically be configured to perform a number of operations designed to optimize execution of the detected game process (stage 224). For example, if hyper-threading is enabled then the game optimization module 160 may set the process affinity for the detected game process to certain non-hyper-threaded cores 104; that is, the game optimization module may cause certain non-hyper-threaded cores to be allocated to the detected game process.

Figure 3:
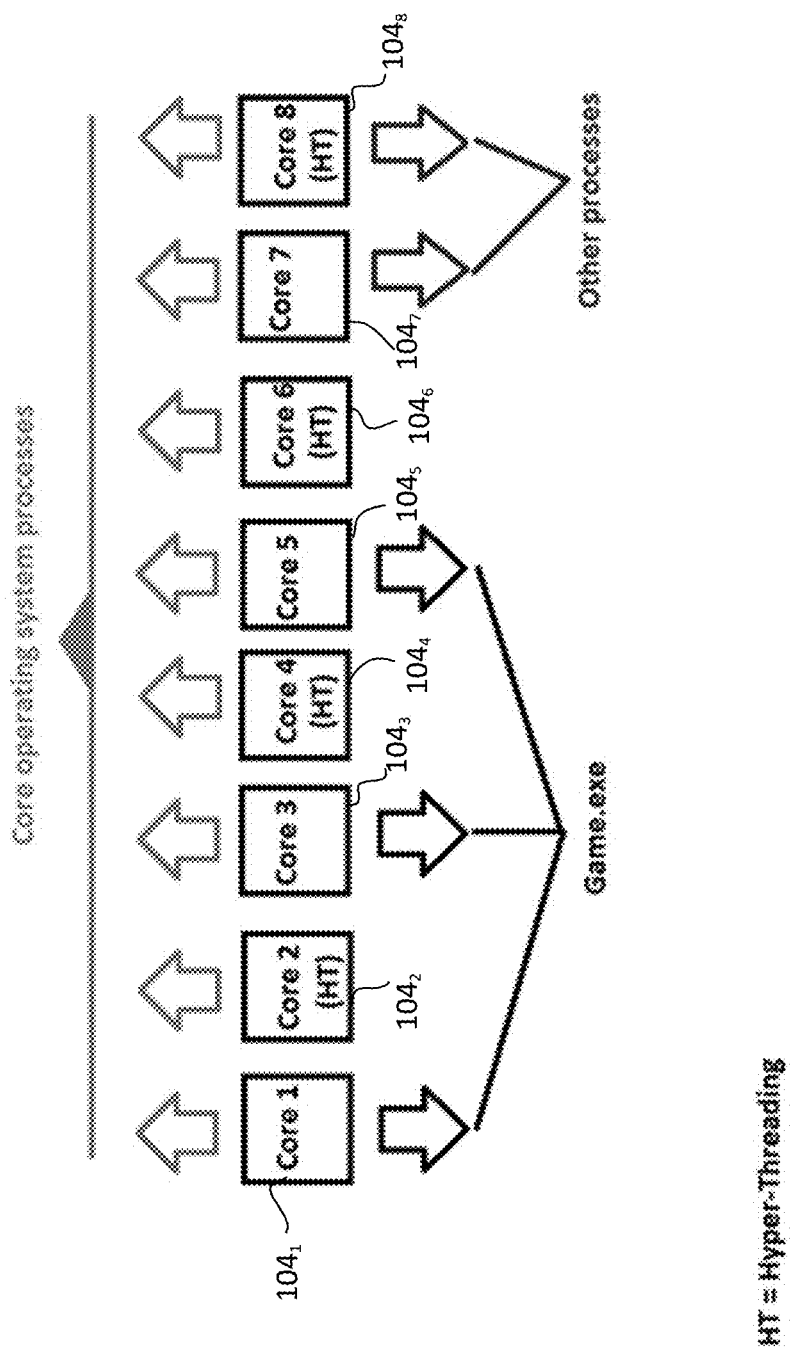
FIG. 3 illustrates one manner in which process affinity of a game process may be set in a system including a set of eight (8) processor cores when hyper-threading is present.

FIG. 3 illustrates one manner in which process affinity of the game process may be set in a system 100' including a set of eight (8) processor cores 104 when hyper-threading is present. As shown, in the example of FIG. 3 all non-hyper-threaded CPU cores 104 except for core $104_7$ and core $104_8$ an allocated to the detected game process (game.exe). In this approach CPU core $104_7$ and core $104_8$ are used for other running processes. In addition, the game optimization module 160 may park the hyper-threaded CPU cores $104_2$, $104_4$, and $104_6$ in order to reduce the heat generated by the CPU 102 during execution of the detected game process.

Figure 4:
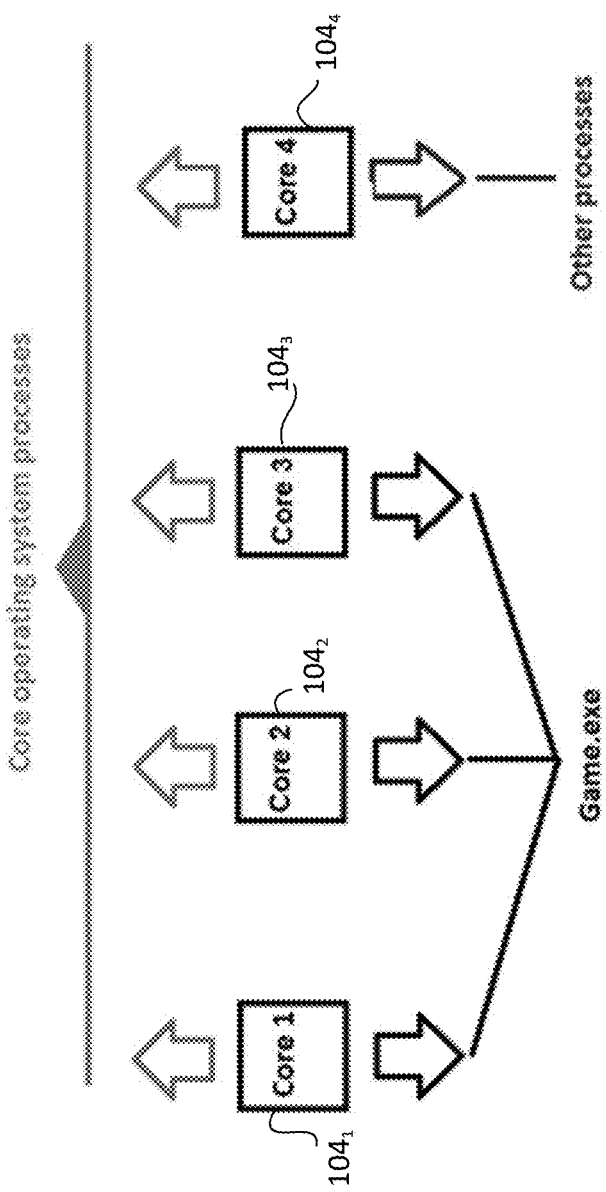
FIG. 4 shows an exemplary setting of process affinity for a detected game process in a system including a set of four (4) CPU cores when hyper-threading is not present.

Turning now to FIG. 4, there is shown an exemplary setting of process affinity for the detected game process in a system 100″ including a set of four (4) CPU cores 104 when hyper-threading is not present. In this case the process affinity is set to processor cores $104_1$, $104_2$, and $104_3$, with CPU core $104_4$ being used for the other running processes.

As part of the game process optimization procedure (stage 224), the CPU priority and disk access (IO) priority of the game process will generally be increased to the highest available level that doesn't result in system instability (e.g., above normal or high priority). Networking priority of the game process can also be increased. In one embodiment, key processes of the operating system 148 (e.g., smss.exe or csrss.exe in the case of Windows) will not have their affinity modified, since doing so could potentially result in interference with the game's performance.

Referring again to FIG. 2, the process affinity of other running processes may be set to those of the CPU cores 104 not allocated to the game process in order to minimize the potential for interference with the game process (stage 228). In the example of FIG. 3, the process affinity of other processes is set to CPU core $104_4$. The CPU and 10 priorities of these other running processes may also optionally be lowered as part of stage 228.

The game optimization module 160 will generally be configured to continuously monitor the system 100 for any new processes and to identify any game processes that have ended or have been minimized (e.g., taken out of fullscreen mode or the foreground) (stage 232). In the case of new non-game processes, their process affinity will be set to be the same as that of any other running non-game processes; that is, any new non-game processes will typically be allocated to CPU cores 104 not allocated to a game process. The network, I/O and other priorities of any new process may also be lowered for the duration of any detected game process. If a game is minimized (stage 236), it is likely the case that a user of the game desires to interact with other programs. Accordingly, in that case some or all system optimizations may be reverted to a default state so that multitasking performs better and the process affinities of other processes may be reset to their normal or default condition (stage 240). In one embodiment, monitoring of minimized game processes continues to occur after such reversion of system optimizations and other processes to default or otherwise normal operating conditions; that is, minimized game processes are monitored to determine if they again are brought to the foreground (stage 244). If any minimized game processes are determined to have been subsequently brought to the foreground (stage 248), then optimizations previously applied may again become active (stage 252).

At some point the game optimization module 160 will generally determine that a game process has ended (stage 256). At this point all processes will typically have their respective process affinities and priorities restored to initial values and the active power plan will be switched to the power plan in effect before the game started (stage 260).

Figure 5:
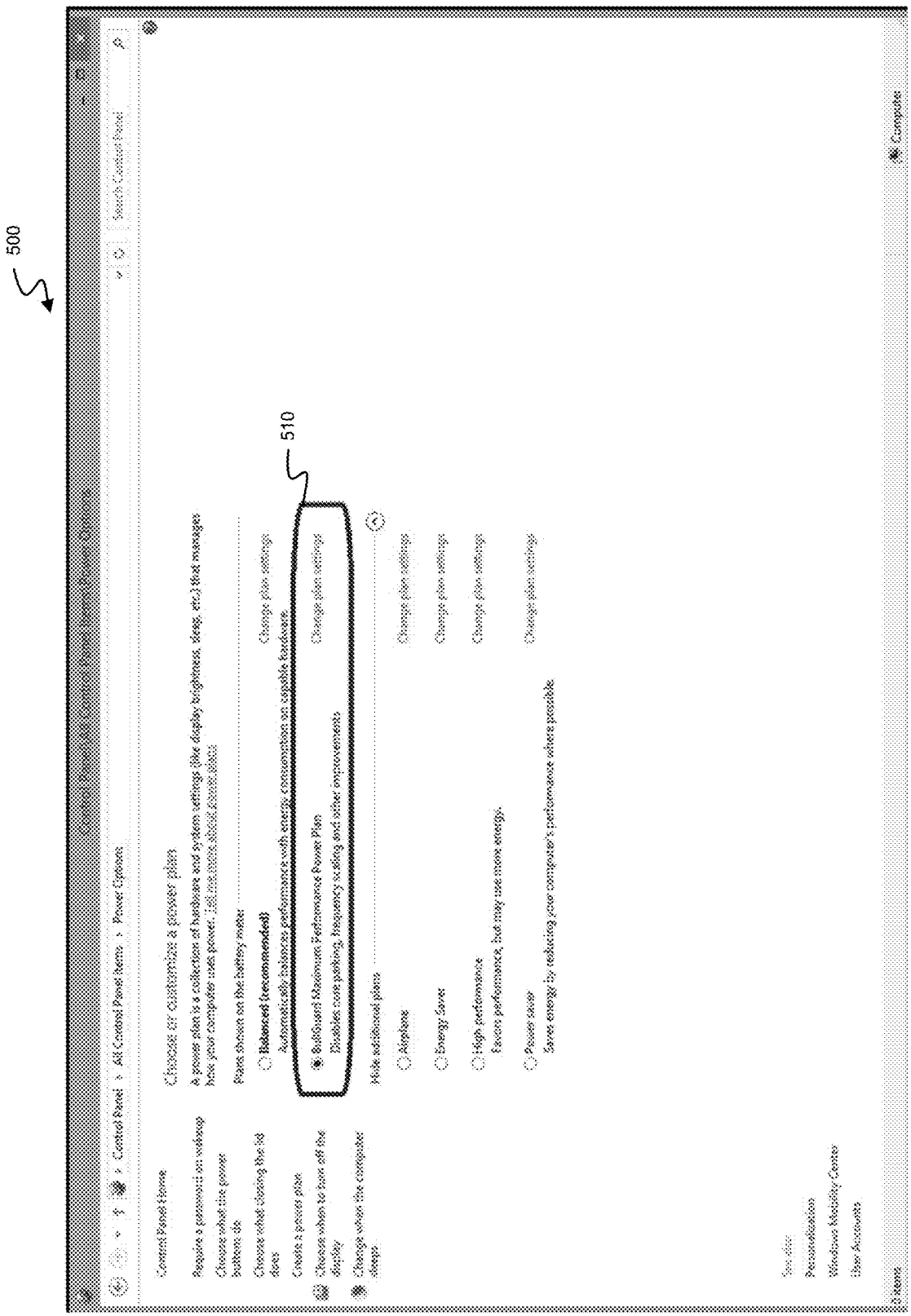
FIGS. 5 and 6 are screen shots of exemplary user interfaces through which parameters of optimizations made by a game optimization module may be adjusted.
Figure 6:
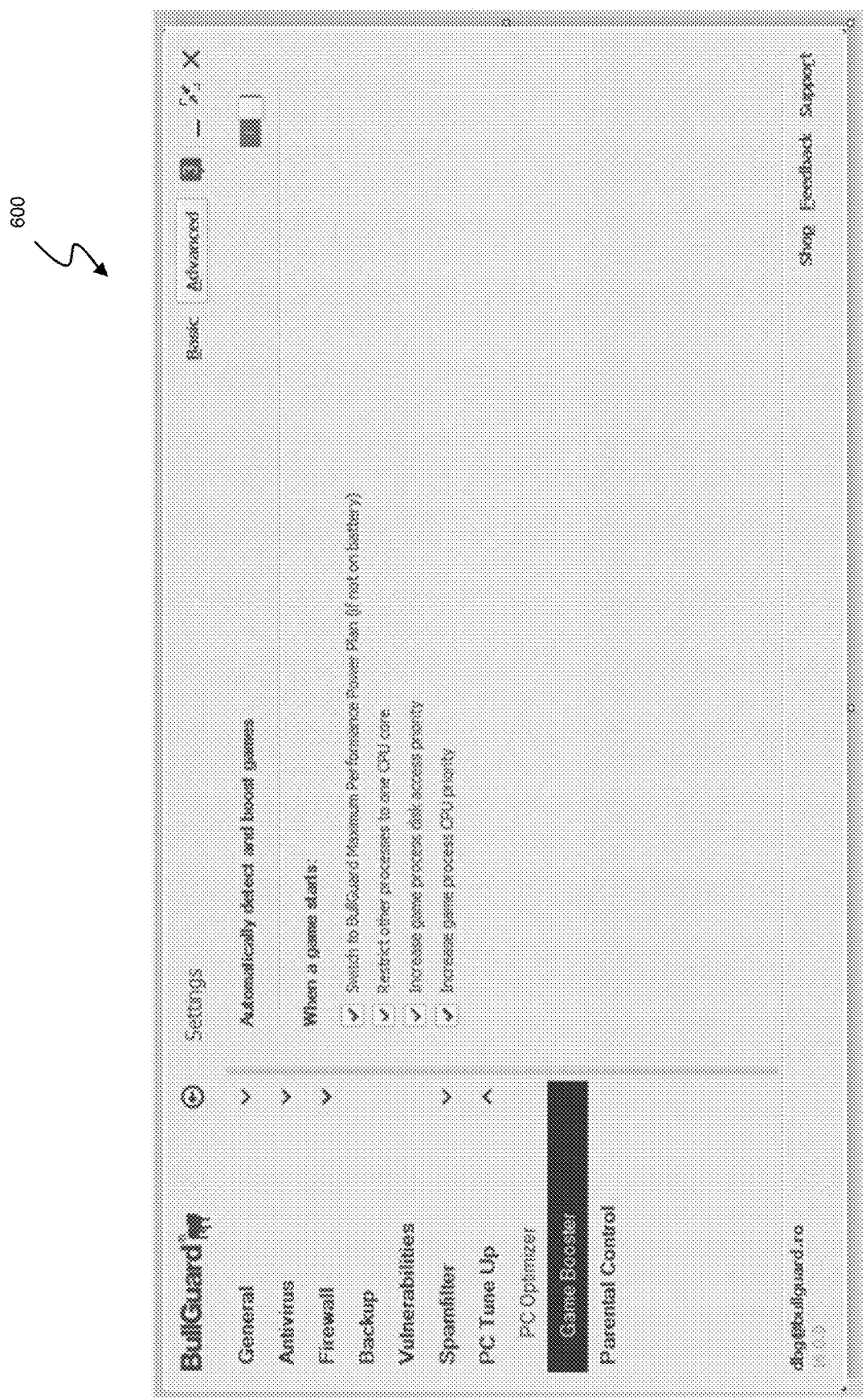

FIGS. 5 and 6 are screen shots of exemplary user interfaces through which parameters of the optimizations made by the game optimization module 160 may be adjusted. Specifically, FIG. 5 is a screen shot of a user interface 500 generated upon selection of a Power Options item in the Control Panel that permits a user to specify settings of the customized higher performance power plan 510 that may be invoked pursuant to stage 220. FIG. 6 is a screen shot of a user interface 600 generated by the antivirus application 158 that permits a user to specify which of various optimizations are performed once a game process has been detected by the game optimization module 160. For example, a user may indicate whether, in the event a game process is detected, the computer system should switch to the customized higher performance power plan, restrict other non-game processes to only one CPU core 104, increase the disk access priority of the detected game process, and/or increase the CPU priority of the detected game process.

A system and method for dynamically allocating resources to a game process that offers advantages relative to prior approaches to improving game performance has been described. Embodiments of the disclosed solution automatically detect game processes and monitor their resource utilization so as to enable the best of several possible optimization schemes to be employed. The disclosed approach advantageously minimizes the necessity for user interaction with the game optimization module or program, thereby enabling even users with minimal knowledge of computer systems to obtain performance benefits. This contrasts with prior approaches in which a user may need to test or otherwise experiment with various features in order to assess their impact on game performance. Prior approaches also fail to utilize other optimizations described herein such as, for example, switching to a higher performance power plan, disabling or tuning core parking, increasing game IO and network priority and decreasing other processes priorities.

Embodiments of the disclosed dynamic resource allocation method may include a combination of: (i) an antivirus, endpoint protection or security program; (ii) automatic detection of start and stop of processes involved in game playing, HD/4K video playing, or similar activities requiring high GPU and CPU utilization; and/or (iii) automatic allocation of all other processes to a single computing core, thereby allowing all other cores to be used for (ii). This automatic allocation may include, for example, allocating the protection program to the single computing core and lowering its resource utilization. An advantage of this approach is that non-game processes, such as security or antivirus processes, are permitted to continue to run, even if at a somewhat slower rate.

If more than one computing core is only minimally utilized at the time of automatic allocation of processes to computing cores, then non-game processes may be allocated across such minimally-utilized computing cores to improve the performance of the non-game processes. Alternatively, the minimally-utilized computing cores could be parked to reduce heat generated by the CPU 102 and thereby potentially improve performance of the game process.

The disclosed solution offers optimization choices not believed to be available through other game enhancement approaches. Such potential optimizations may include, for example, like switching to a higher performance power plan, disabling or tuning core parking, increasing game IO and network priority while decreasing the CPU, IO and network priority of other processes, custom program(s) launching after a game is detected, stopping or freezing unneeded processes. Moreover, it is believed that detection of game processes by, for example, monitoring GPU utilization in combination with detection of the graphics APIs (e.g., DirectX and OpenGL) actually utilized is a novel approach to improving game performance. This game process detection scheme in combination with the automatic computer resources allocation techniques described herein are also believed to be unique. In addition, the technique of monitoring the CPU utilization of a game process to determine the number of processing cores the game needs to perform optimally and then parking certain unneeded cores to reduce heat generated by a CPU is also believed to a novel method of improving game performance.

Although the disclosed game process detection and optimization techniques have been described as operating within the context of an antivirus, endpoint protection or security program, the disclosed techniques may be employed to enhance game process performance in the presence of other processes which may impair game performance through high utilization of CPU resources. Such other processes may include, for example, background monitoring programs such as backup applications, automatic clean up tools, performance tuning tools, and disk optimization tools. More generally, the teachings herein may be applied to the case in which one or more running programs (program A) may potentially interfere with the execution of another program of interest (program B). For example, the running processes corresponding to program A may be initially monitored. When it is automatically detected that program B begins to use the same processing core on which program A resides, program A is automatically move to an different, available processing core in order to improve the performance of program B.

In some configurations, the apparatus or system includes means for performing various functions as described herein. In one aspect, the aforementioned means may be a module including a processor or processors and associated memory in which embodiments of the invention reside, such as are shown in the preceding drawings and which are configured to perform the functions recited by the aforementioned means. This may be, for example, modules or apparatus residing in client devices, host server systems, and/or other network devices such as are shown and/or described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

We claim:

1. A method of allocating computer resources in a computer system including a multicore processor having a plurality of cores, the method comprising:
monitoring usage of the computer resources by processes executing on the computer system, the monitoring including monitoring usage of at least one of the multicore processor and a graphics processing unit;
determining, based upon the monitoring, that one of the processes is a high-utilization process of an application in an interactive state, the determining including detecting a condition wherein the condition indicates: (i) the high-utilization process is consuming greater than a predefined threshold of the computer resources and is running in a fullscreen mode, (ii) a graphics API has been loaded or initialized in the computer system;
allocating one or more of the plurality of cores to the high-utilization process wherein other of the plurality of cores are allocated to remaining ones of the processes, thereby improving performance of the high-utilization process;
detecting the application has transitioned from the interactive state; wherein the detecting includes monitoring the processes executing on the computer system to determine whether the high-utilization process has transitioned from operating in the fullscreen mode; and
enabling, based upon the detecting, the one or more of the plurality of cores to be allocated to other than the high-utilization process.

2. The method of claim 1 wherein the application is a game application.

3. The method of claim 2 wherein the detecting includes determining that at least one of (i) a user interface window of the game application has been minimized, and (ii) the game application has transitioned from operation in the fullscreen mode.

4. The method of claim 2 wherein the determining includes determining that the one of the processes consumes greater than a predefined threshold of usage of a GPU of the computer system and that the application utilizes a graphics API.

5. The method of claim 1 wherein the detecting the application has transitioned includes monitoring the processes executing on the computer system to determine whether the window for the high-utilization process has been taken out of the foreground.

6. The method of claim 1 wherein the allocating includes setting an affinity of the high-utilization process to the one or more of the plurality of cores.

7. The method of claim 1 wherein the monitoring includes monitoring usage of the multicore processor and wherein the predefined threshold corresponds to predetermined percentage of resources of the multicore processor, the determining further including detecting that a graphics API has been loaded.

8. The method of claim 1 further including increasing at least one of a processor priority and an IO priority of the high-utilization process, thereby further improving the performance of the high-utilization process.

9. The method of claim 1 further including at least one of stopping other of the processes or delaying execution of one or more tasks scheduled by the computer system.

10. The method of claim 1 wherein at least one of the plurality of cores is a hyper-threaded core, the method further including parking the hyper-threaded core.

11. The method of claim 1 further including launching, in response to the determining, a self-configured program operative to stop or delay execution of one or more of the processes or one or more tasks scheduled for execution by the computer system.

12. The method of claim 1 further including launching, in response to the determining, an overclocking program operative to modify a clock rate of at least one of the multicore processor and a graphics processing unit.

13. The method of claim 1 wherein one of the remaining ones of the processes allocated to other of the plurality of cores corresponds to an antivirus protection program, the method further including lowering resource utilization of the antivirus program.

14. The method of claim 1 wherein the remaining ones of the processes include one or more of a backup program, a cloud file sync program, and an e-mail sync program.

15. The method of claim 14 further including lowering a resource utilization of one or more of the remaining ones of the processes.

16. A method of claim 1 wherein the allocating includes allocating a first of the plurality of cores to a first thread of the high-utilization process and allocating a second of the plurality of cores to a second thread of the high-utilization process.

17. The method of claim 1 wherein the high-utilization process corresponds to a game, the method further including determining the game needs a number of processing cores to perform optimally wherein the one or more of the plurality of cores allocated to the high-utilization process is equal to the number of processing cores.

18. A method for improving performance of a game process in a computer system including a multicore processor having a plurality of cores, the method comprising:
monitoring usage of resources of the computer system by processes executing on the computer system, the monitoring including monitoring usage of at least one of the multicore processor and a graphics processing unit;
automatically detecting, based upon the monitoring usage, the game process has begun executing on one or more of the plurality of cores wherein the automatically detecting includes detecting a condition wherein the condition indicates: (i) a high-utilization process is consuming greater than a predefined threshold of the resources and is running in a fullscreen mode, and (ii) a graphics API has been loaded or initialized in the computer system; and automatically allocating, in response to the automatically detecting the process has begun executing, other processes to one of the plurality of cores different from the one or more of the plurality of cores on which the game process is executing.

19. The method of claim 18 wherein the other processes include one or more of an antivirus program, an endpoint protection program and a security program.

20. The method of claim 18 wherein the other processes include one or more of a backup program, a cloud file sync program, and an e-mail sync program.

21. The method of claim 18 further including lowering a resource utilization of the other processes.

22. A computer system configured to optimize application performance, the computer system comprising:
   a multicore processor having a plurality of cores;
   a graphics processing unit;
   a memory including a performance optimization module wherein the performance optimization module is configured for:
      monitoring usage of computer resources by processes executing on the computer system, the computer resources including at least one of the multicore processor and the graphics processing unit;
      determining that one of the processes is a high-utilization process of an application in an interactive state, the determining including detecting a condition wherein the condition indicates: (i) the high-utilization process is consuming greater than a predefined threshold of the computer resources and is running in a fullscreen mode, and (ii) a graphics API has been loaded or initialized in the computer system;
      allocating one or more of the plurality of cores to the high-utilization process wherein other of the plurality of cores are allocated to remaining ones of the processes, thereby improving performance of the high-utilization process;
      detecting the application has transitioned from the interactive state wherein the detecting includes monitoring the processes executing on the computer system to determine whether the high-utilization process has transitioned from operating in the fullscreen mode; and
      enabling the one or more of the plurality of cores to be allocated to other than the high-utilization process.

23. The computer system of claim 22 wherein the active state corresponds to at least one of (i) operation of the application in one of a fullscreen mode, and (ii) operation of the application in a windowed mode wherein a window of the application is a foreground window.

24. The computer system of claim 22 wherein the performance optimization module is further configured to set an affinity of the high-utilization process to the one or more of the plurality of cores.

25. A method of allocating computer resources in a computer system including a multicore processor having a plurality of cores, the method comprising:
   monitoring usage of the computer resources by processes executing on the computer system, the monitoring including monitoring usage of at least one of the multicore processor and a graphics processing unit;
   determining, based upon the monitoring, that one of the processes is a high-utilization process of an application in an interactive state, the determining including detecting a condition wherein the condition indicates: (i) the high-utilization process is consuming greater than a predefined threshold of the computer resources and is in a windowed mode in which the window for the high-utilization process is in the foreground, and (ii) a graphics API has been loaded or initialized in the computer system;
   allocating one or more of the plurality of cores to the high-utilization process wherein other of the plurality of cores are allocated to remaining ones of the processes, thereby improving performance of the high-utilization process;
   detecting the application has transitioned from the interactive state wherein the detecting includes monitoring the processes executing on the computer system to determine whether the high-utilization process has transitioned from operating in the fullscreen mode; and
   enabling, based upon the detecting, the one or more of the plurality of cores to be allocated to other than the high-utilization process.

\* \* \* \* \*